United States Patent
Arbeus

(10) Patent No.: US 6,540,924 B2
(45) Date of Patent: Apr. 1, 2003

(54) METHOD AND A DEVICE FOR TREATING LIQUIDS

(75) Inventor: Ulf Arbeus, Lidingo (SE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 100 days.

(21) Appl. No.: 09/902,413

(22) Filed: Jul. 10, 2001

(65) Prior Publication Data

US 2002/0017498 A1 Feb. 14, 2002

(30) Foreign Application Priority Data

Aug. 11, 2000 (SE) .......................... 0002871-2

(51) Int. Cl.⁷ ................................................ C02F 3/00
(52) U.S. Cl. .......................... 210/758; 210/620; 261/84
(58) Field of Search ................................ 210/758, 209; 261/84

(56) References Cited

2002/0033543 A1 * 3/2002 Batterham et al. ............ 261/84

* cited by examiner

*Primary Examiner*—Chester T. Barry

(57) ABSTRACT

The invention concerns a method and a device for treating liquids, such as wastewater. According to the invention the liquid is transported by help of a pump (10) from the lower area of a tank (1) through a vertically directed pipe (3) up to a 180 degree bend (5) located above the water surface and where air is sucked in through openings in the bend. The air-liquid mixture is then guided through a second pipe (6) having its outlet (7) close to the tank bottom (2). In this area the flow is once more linked 180 degrees and is directed through a third pipe (8) ending close to the water surface. Thanks to the linking through the pipe (8), a decrease of the static head is obtained against which the pump (10) operates.

3 Claims, 1 Drawing Sheet

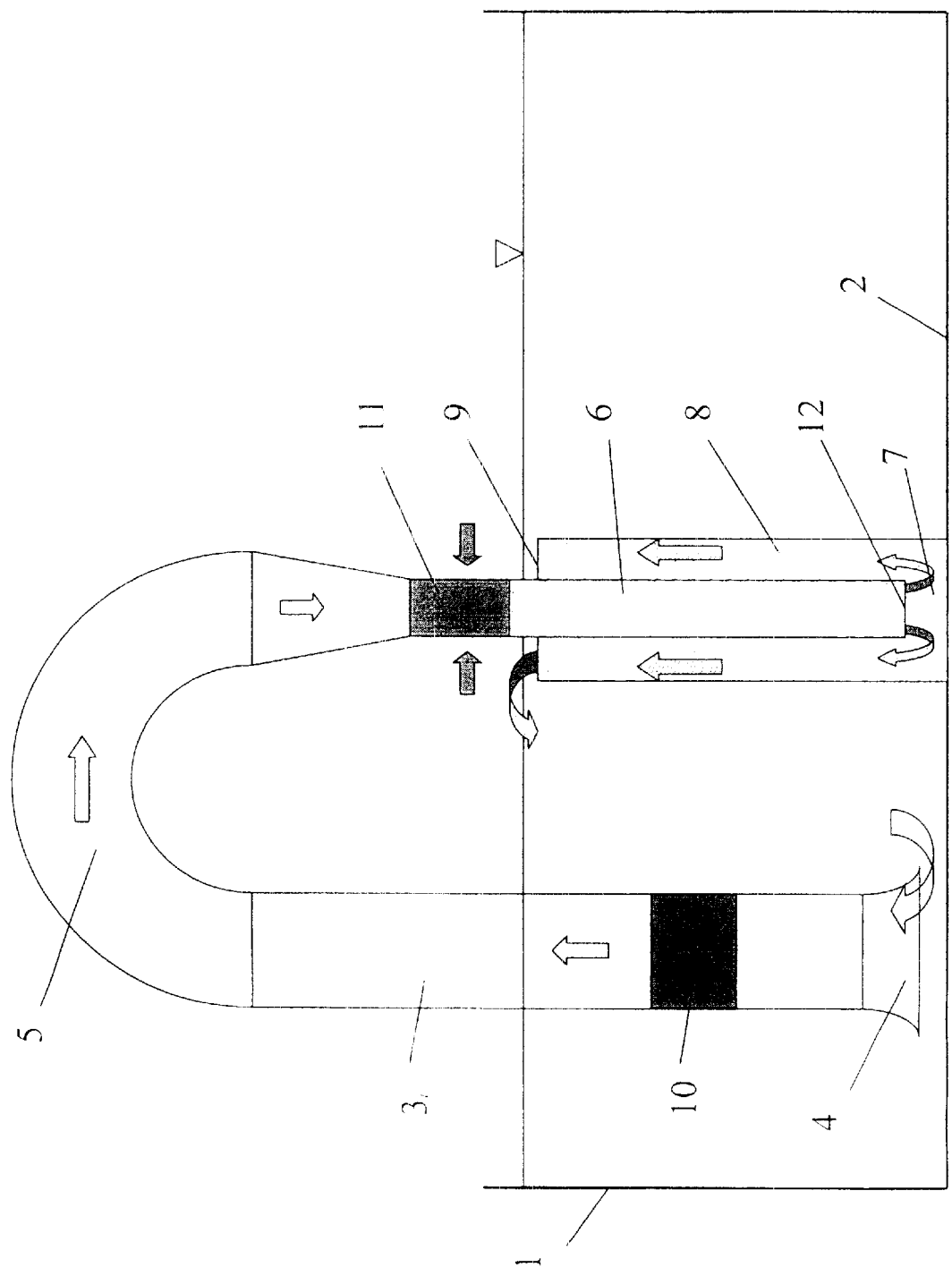

METHOD AND A DEVICE FOR TREATING LIQUIDS

The invention concerns a method and a device for treating liquids such as municipal wastewater, industrial process liquids etc, where air or another gas is added during mixing. In the following will be described the use of the invention for treatment of wastewater.

Wastewater very often contains a big amount of solid pollutants, which must be kept in suspension in order to be possible to transport. In addition the water lacks oxygen, which causes a bad smell and creates a corrosive environment.

In order to solve these problems mixing and aerating devices are arranged for treating the wastewater in pump stations as well as in storing tanks. Examples are shown in Swedish patents 366 013 and 439 592.

The aeration devices may be designed as air nozzles, which are fed by compressors, turbine aerators that create under pressure and suck down air from the atmosphere, ejector nozzles from which a mixture of air and liquid is sprayed down into the water etc.

In order to make the aeration effective, the time during which the air bubbles stay within the water must be long and this means that the air must be fed at a considerable depth. The energy demand is however mainly proportional to the depth and this means that the efficiency is relatively independent of the depth.

As the energy demand is proportional to airflow and the gas exchange to the interface between air and liquid, the efficiency increases when the sizes of the bubbles diminish.

As the aeration requires a lot of energy and constitutes an important part of the energy costs for a purification plant, it is a very interesting subject to make the aeration as effective as possible. A figure that shows how effective the aeration is may be defined as the ratio between the amount of oxygen solved in the water and the amount of used electric energy, (kg $O_2$/kWh). In devices known today, said ratio varies between 1 and 6, where the highest values concern so-called fine bubble systems. The choice of aeration system is normally decided depending on a balancing between costs for investment and the operation performance.

The purpose with the invention is thus to obtain a method and a device which makes possible an effective and energy saving mixing and which simultaneously has a design which requires little space. The invention is stated in the accompanying claims and is described more closely below with reference to the enclosed drawing.

In the drawing 1 stands for a water tank with a bottom 2, 3 a pipe with an inlet 4 and a 180 degree bend 5, 6 a pipe with an outlet 7 and 8 a pipe with an outlet 9 close to the water surface. 10 stands for a pump, 11 an air intake and 12 a second bend.

The tank 1, which for instance serves as an equalizing tank in a purification plant for sewage water in front of the purification process, contains a large amount of water, which shall be stirred to prevent solid bodies from sedimentation and aerated as a preparation for purification steps to follow.

According to the invention, a vertically oriented pipe 3 is arranged in the tank 1 and having an inlet 4 adjacent the bottom 2 of the tank. The pipe 3 reaches up above the water surface where it transforms into a bend 5 which directs the pipe downwards. The continuation of the pipe is directed vertically downwards, within or beside the tank. The lower end 7 of the pipe 6, which preferably is located close to the bottom 2 of the tank 1, is provided with a second bend 12. A connecting pipe 8 surrounds said bend and continues vertically upwards and ends with an outlet 9 close to the water surface. A current is created within the pipes from the inlet 4 and towards the outlet 9 by help of a suitable pump 10.

The aeration is obtained by air being sucked in through openings 11 in the part of the pipe 3 that is located above the water surface. Air being sucked in thanks to the under pressure that occurs within said pipe. Normally there is no need for feeding pressurized air, but is of course a possibility. In addition it should be stressed that the openings 11 are designed to create as small bubbles as possible.

Before start an evacuation of the pipe system should be carried out, for instance by help of the pump 10 or by a separate vacuum pump.

The air that is sucked in through the openings 11 accompanies the water flow downward within the pipe part 6 and the aeration of the water starts. According to the invention the lower end 7 of the pipe 3 should be so designed, that the upward linking of the air/water mixture should be as free from losses as possible. According to a preferred embodiment of the invention, the pipes 6 and 8 are arranged concentric, preferably with the pipe 6 within the pipe 8. This brings about an important advantage as symmetry relative the direction of gravity can be obtained for the gas-liqidmixture. Due to the fact that the pipes are directed vertically, the homogeneity of the fluid may be kept for obtaining a maximum efficiency.

The pipe 8, the upper end of which ends above the water surface, is preferably designed with an area increase in the direction of the flow in order to diminish the flow loss and to increase the duration of stay of the air bubbles.

As mentioned earlier, the inlet 4 of the pipe is arranged close to the bottom of the tank. As the outlet of the system is arranged close to the water surface, a vertically directed flow will occur within the tank, which flow in a favorable way causes the naturally aerated water at the surface to add to the total aeration.

By help of the invention a method and a device for treatment of liquids have been obtained, which are simple to use and design and which also obtain a very good efficiency. The reason for that the system according to the invention is more effective than the systems used today, is that the pump operates against a lower static head thanks to the reduced pressure head obtained by the pipe 8. As the main energy demand in a system according to the invention depends on the reduced density in the downwardly flow within the pipe 6, a considerable energy saving is obtained because of the balancing effect obtained by the gas-water mixture in the pipe 8.

In the specification above treatment of sewage water has been referred to. The invention is however also applicable in other areas of liquid treatment.

What is claimed is:

1. A method to treat liquids such as municipal wastewater industrial process liquids etc, where air or another gas is added, characterized in,
   that liquid is transported from the lower area of a tank through a pipe that reaches up above the water surface, the pipe having a length and a design above the surface such that a loss eliminated flow is obtained and which is directed from an upward flow into a downward vertical flow,
   that the static under pressure prevailing in parts of the pipe above the water surface is utilized for adding of a suitable amount of air or another gas,
   that the pipe after the bend above the water surface transports the gas-water mixture essentially vertically downwards, that the gas-water mixture is linked upwards at a suitable location, preferably in level with the bottom of the tank, into an upward vertical flow, that the upwardly directed flow occurs within a pipe having its end close to the water surface.

2. A device for performing the method according to claim 1, characterized in that it comprises, a water tank (1) having a bottom (2), a first pipe (3) within said tank for transport of water, said pipe having an inlet (4) close to said tank bottom (2) and a 180 degree bend (5) located above the water surface and provided with one or several openings (11) for adding of air or another gas, a second pipe (6) connected to the first pipe (3) after the bend (5) and having an outlet (7) close to the tank bottom (2), a third pipe (8) surrounding the second pipe (6) and having an outlet (9) close to the water surface and a device (10) for obtaining a liquid transport through the pipes (3, 6 and 8).

3. A device according to claim 2, characterized in, that the pipe (8) has an area increase in the direction of the flow.

* * * * *